(12) United States Patent
Poirette et al.

(10) Patent No.: US 9,334,983 B2
(45) Date of Patent: May 10, 2016

(54) HOOP WINDING METHOD FOR REINFORCING THE AXIAL STRENGTH AND THE INTERNAL PRESSURE STRENGTH OF A TUBE

(75) Inventors: Yann Poirette, Reventin-Vaugris (FR); Daniel Averbuch, Vernaison (FR)

(73) Assignee: IFP ENERGIES NOUVELLES, Rueil Malmaison (FR)

( * ) Notice: Subject to any disclaimer, the term of this patent is extended or adjusted under 35 U.S.C. 154(b) by 337 days.

(21) Appl. No.: 13/806,208

(22) PCT Filed: Jun. 10, 2011

(86) PCT No.: PCT/FR2011/000340
§ 371 (c)(1),
(2), (4) Date: Feb. 21, 2013

(87) PCT Pub. No.: WO2011/161331
PCT Pub. Date: Dec. 29, 2011

(65) Prior Publication Data
US 2013/0146172 A1    Jun. 13, 2013

(30) Foreign Application Priority Data
Jun. 22, 2010 (FR) ..................... 10 02617

(51) Int. Cl.
*F16L 9/04* (2006.01)
*B29C 70/56* (2006.01)
(Continued)

(52) U.S. Cl.
CPC ............... *F16L 9/042* (2013.01); *B21D 26/033* (2013.01); *B21D 49/005* (2013.01);
(Continued)

(58) Field of Classification Search
CPC .... B29C 70/56; B29C 63/24; B29C 61/0616; B29C 61/0633; B29C 61/065; B29C 61/0658; B29C 63/0069; B29C 63/42; B29C 69/008; B21D 26/033; B21D 3/12; B21D 39/04; B21D 49/00; B21D 49/05; B21D 26/035; B21D 26/051; B21D 26/043; B21D 49/005; E21B 17/01; F16L 9/04; F16L 9/042; F16L 9/147
USPC ............ 72/370.22, 46, 58, 301, 377–378, 61, 72/62, 302, 367.1, 368, 370.06, 370.08; 138/174; 242/438; 29/421.1, 507, 29/522.1, 523
See application file for complete search history.

(56) References Cited

U.S. PATENT DOCUMENTS 2,984,870 A * 5/1961 Warnken .................. B29C 49/44
138/DIG. 2

(Continued)

FOREIGN PATENT DOCUMENTS

| FR | 2 857 690 A1 | 1/2005 |
| WO | WO 82/01159 | 4/1982 |
| WO | WO 01/62477 A2 | 8/2001 |

*Primary Examiner* — Peter DungBa Vo
*Assistant Examiner* — Joshua D Anderson
(74) *Attorney, Agent, or Firm* — Fitch, Even, Tabin & Flannery LLP

(57) ABSTRACT

The hoop winding method allows to manufacture a reinforced tube by carrying out the following operations:
  depositing a reinforcing layer 2 around metal tube 1, then imposing a tensile force at the metal tube ends so as to plastically deform the metal tube by applying a pressure P2 in enclosure Z2, the force being determined to introduce a compressive stress in the metal tube after release of the force, and
  imposing a pressure P1 in enclosure Z1 in order to apply a pressure onto the inner wall of the metal tube so as to plastically deform the metal tube, the pressure being determined to introduce a compressive stress in the metal tube after release of the pressure.

The fact that the two enclosures Z1 and Z2 are distinct and independent allows pressures P1 and P2 to be applied independently of one another. Thus, the method allows independent radial and axial prestresses to be applied so as to optimize the strength of the hoop-wound tube.

10 Claims, 7 Drawing Sheets

(51) Int. Cl.
*B21D 26/033* (2011.01)
*B21D 49/00* (2006.01)
*B29C 69/00* (2006.01)
*E21B 17/01* (2006.01)
*F16L 9/147* (2006.01)
*B29C 61/06* (2006.01)
*B21D 39/04* (2006.01)
*B29C 63/24* (2006.01)

(52) U.S. Cl.
CPC .............. *B29C 69/008* (2013.01); *B29C 70/56* (2013.01); *E21B 17/01* (2013.01); *F16L 9/147* (2013.01); *B21D 39/04* (2013.01); *B29C 61/0633* (2013.01); *B29C 61/0658* (2013.01); *B29C 63/24* (2013.01); *Y10T 29/4994* (2015.01); *Y10T 29/49911* (2015.01)

(56) References Cited

U.S. PATENT DOCUMENTS

| | | | | |
|---|---|---|---|---|
| 4,217,158 | A * | 8/1980 | Puck | B29C 70/56 156/156 |
| 4,622,086 | A * | 11/1986 | Puck et al. | 156/166 |
| 5,288,109 | A | 2/1994 | Auberon et al. | |
| 6,042,152 | A | 3/2000 | Baldwin et al. | |
| 6,146,482 | A | 11/2000 | Patton et al. | |
| 6,305,204 | B1 * | 10/2001 | Tauzer | 72/62 |
| 6,354,334 | B1 * | 3/2002 | Ellyin et al. | 138/143 |
| 7,963,337 | B2 * | 6/2011 | Pallini et al. | 166/367 |
| 2008/0087351 | A1 * | 4/2008 | Paulshus | F16L 25/0072 138/141 |
| 2009/0050730 | A1 * | 2/2009 | Pallini | B29C 63/10 242/438 |
| 2010/0032214 | A1 | 2/2010 | Pallini, Jr. et al. | |

* cited by examiner

HOOP WINDING METHOD FOR REINFORCING THE AXIAL STRENGTH AND THE INTERNAL PRESSURE STRENGTH OF A TUBE

FIELD OF THE INVENTION

The present invention relates to the sphere of hoop-wound reinforced metal tubes. The tubes according to the invention are well suited for equipping offshore drilling rigs and/or an offshore oilfield production facility.

BACKGROUND OF THE INVENTION

A pipe generally referred to as a "riser", allowing the wellhead arranged on the sea bottom to be connected to a support at the sea surface, is used for drilling a well at sea or for producing a petroleum effluent from an offshore reservoir. A drilling or a production riser is made up of an assembly of tubular elements assembled by connectors. The tubular elements are assembled on the drilling site, from a floater. The riser is lowered into the water depth as the tubular elements are assembled, until the wellhead located on the sea bottom is reached.

In the perspective of drilling at water depths that can reach 3500 m or more, the weight of the riser becomes very penalizing. This phenomenon is increased by the fact that, for the same maximum working pressure, the length of the riser requires a larger inside diameter for the auxiliary lines, considering the necessity to limit pressure drops. Using hoop-wound tubes according to the invention as the main tube or as an auxiliary tube of a drilling riser allows to significantly reduce the weight thereof and thus to operate at greater depths. Similarly, production risers are subjected to increasingly high stresses linked with the pressure and with the weight thereof, which the present invention allows to reduce.

There are various hoop winding methods allowing a metal tube to be reinforced by arranging composite reinforcing elements, generally in form of a tape consisting of polymer-coated fibers, under stress around the metal tube. Hoop winding allows the mechanical strength of the tube to be increased without significantly increasing the weight thereof, considering the low weight of the reinforcing elements.

A hoop winding technique referred to as circumferential hoop winding consists in winding a reinforcing element around a metal tube so as to increase the internal pressure resistance of the tube. For example, document WO-82/01,159 aims to wind the reinforcing element around the metal tube while introducing a tension. Thus, the reinforcing element wound around the tube undergoes a tensional stress, which causes the metal tube to be under stress. The radial prestress undergone by the tube is similar to the prestress that would be produced by an outside pressure.

Another hoop winding method referred to as axial hoop winding aims to introduce axial compressive stresses in the metal tube and axial tensile stresses in the reinforcing element. For example, document US-2010/0,032,214 discloses a device consisting of a part that is axially mobile with respect to the metal tube so as to introduce tensile forces in the reinforcing element and compressive forces in the metal tube.

The present invention aims to associate circumferential hoop winding and axial hoop winding so as to combine the weight reductions provided by these two techniques. However, this combination poses the problem of bringing the axial hoop and the circumferential hoop under stress. Indeed, axial hoop winding mainly conditions the tensile strength of the hoop-wound tube, whereas circumferential hoop winding mainly conditions the internal pressure strength of the tube. It is important that the axial hoop winding operations do not modify, or only scarcely, the circumferential hoop winding characteristics and, conversely, that the circumferential hoop winding operations do not modify, or only scarcely, the axial hoop winding characteristics.

The present invention provides a hoop winding technique that combines a circumferential and axial reinforcement of the metal tube while allowing radial compressive prestresses to be introduced independently of the axial compressive prestresses in the metal tube.

SUMMARY OF THE INVENTION

In general terms, the present invention relates to a hoop winding method for manufacturing a reinforced tube, wherein the following operations are carried out:

a) providing a metal tube, then b) depositing a reinforcing layer around the metal tube, the layer comprising elongate internal pressure and axial traction reinforcement elements, then c) imposing a tensile force at the metal tube ends so as to plastically deform the metal tube, the force being oriented parallel to the metal tube axis, the force being determined to introduce a compressive stress in the metal tube after release of the force, and d) imposing a pressure onto the inner wall of the metal tube so as to plastically deform the metal tube, the pressure being determined to introduce a compressive stress in the metal tube after release of the pressure, the method being characterized in that the value of said pressure is set independently of the value of said tensile force.

According to the invention, in operation c), the tensile force can be imposed using a jack.

In stage d), an enclosure can be formed in the metal tube, part of the enclosure being made up of said inner wall of the metal tube, and a fluid under pressure can be injected into the enclosure. The enclosure can have an annular shape contained between the inner wall of the metal tube and a tubular second wall arranged in the metal tube.

Operations c) and d) can be carried out simultaneously.

Alternatively, operations c) and d) can be carried out sequentially.

The reinforcing layer can be secured to both ends of the metal tube by linking means.

In stage b), at least a first part of the elongate reinforcing elements can be deposited by forming an angle ranging between 0° and 45° to the tube axis, and at least a second part of the elongate reinforcing elements can be deposited by forming an angle ranging between 45° and 90° to the tube axis.

Alternatively, the elongate elements can be deposited by forming an angle ranging between 45° and 60°.

The metal tube can be made from steel, an aluminium alloy or a titanium alloy.

The elongate elements can consist of reinforcing fibers coated with a polymer matrix. The reinforcing fibers can be selected from among glass fibers, carbon fibers and aramid fibers, and the polymer matrix can be selected from among a polyethylene, a polyamide, a polyether ether ketone, a polypropylene, a polyvinylidene fluoride and an epoxide.

The invention also comprises the reinforced tube obtained with the method according to the invention.

BRIEF DESCRIPTION OF THE FIGURES

Other features and advantages of the invention will be clear from reading the description hereafter, with reference to the accompanying figures wherein.

DETAILED DESCRIPTION

Figure 1:
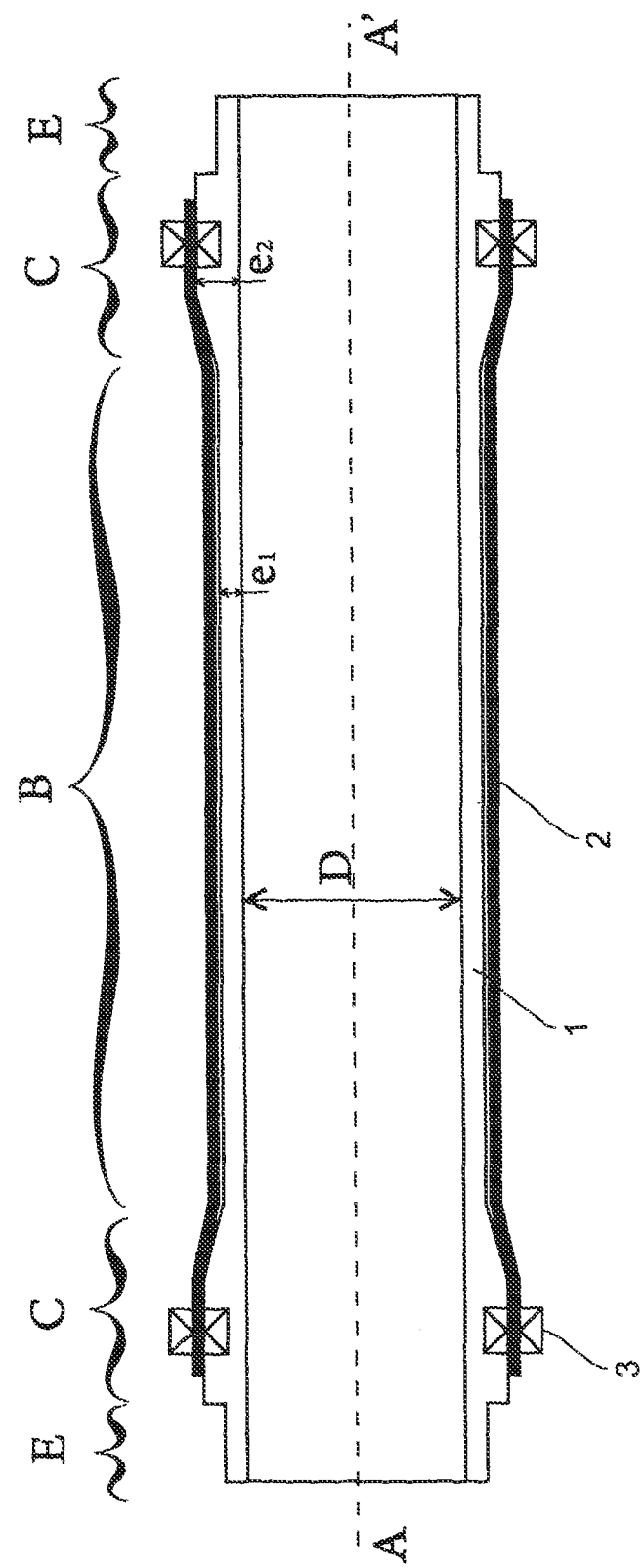
FIG. 1 shows the structure of a hoop-wound tube.

FIG. 1 shows a metal tube 1 of axis AA' that is reinforced by a reinforcing layer 2. The tube comprises an intermediate part B of substantially constant thickness e1 and of substantially constant inside diameter D over the length of part B. Part B is surrounded by two parts C allowing cooperation of the metal tube with reinforcing elements 2. Parts C can be reinforced for example by a metal thickness e2 greater than thickness e1. Finally, the ends of tube 1 are provided with connection terminals E.

Tube 1 can be made from steel, X60, X80, X100 steel for example. Tube 1 can be made from an aluminium alloy. For example, aluminium alloys of ASTM (American Standard for Testing and Material) references 1050 1100 2014 2024 3003 5052 6063 6082 5083 5086 6061 6013 7050 7075 7055 or aluminium alloys marketed under references C405 CU31 C555 CU92 C805 C855 C70H by the ALCOA Company can be used. Tube 1 can also be made from a titanium alloy. For example, a Ti-6-4 titanium alloy (comprising, in percent by weight, at least 85% titanium, around 6% aluminium and 4% vanadium) can be used, or the Ti-6-6-2 alloy comprising, in percent by weight, around 6% aluminium, 6% vanadium, 2% zinc and at least 80% titanium.

Part B of the tube is generally manufactured from a laminated or extruded blank. Parts C and E can be parts obtained by machining, forging or casting. Parts C and E can be welded to part B.

Reinforcing layer 2 can consist of reinforcing elements, for example elongate elements (strips or wires) made of fibers, for example glass, carbon or aramid fibers, the fibers being coated with, or impregnated by, a polymer matrix. The polymer matrix can be made from a thermoplastic material such as polyethylene, polyamide (notably PA11, PA6, PA6-6 or PA12), polyether ether ketone (PEEK), polypropylene (PP) or polyvinylidene fluoride (PVDF). The polymer matrix can also be made from a thermosetting material such as epoxides. In the present description, an elongate element designates an element one dimension of which is very large in relation to the others. The reinforcing elements are deposited as layers on tube 1, i.e. by forming a continuous sheath of substantially constant thickness on part B and possibly on a portion of parts C of tube 1.

Reinforcing elements can be deposited on the outer surface of tube 1 by forming an angle ranging between 45° and 60° for axial and radial reinforcement of the metal tube.

Alternatively, part of the reinforcing elements can be deposited on the outer surface of tube 1 in a substantially parallel direction to axis AA' so as to axially reinforce the metal tube, for example by forming an angle ranging between 0° and 45°, preferably between 0° and 30°, to axis AA'. The other part of the reinforcing elements can be deposited on the outer surface of tube 1 in a substantially perpendicular direction to axis AA' so as to radially reinforce the metal tube, for example by forming an angle ranging between 45° and 90°, preferably between 60° and 90°, to axis AA'. For example, reinforcing elements are helically wound around tube 1 so as to form reinforcing layer 2.

Generally, in order to balance the strength of the elongate reinforcing elements, when an amount of elements is deposited at an angle α, an equivalent amount of elements is deposited at an angle-α. In the present description, when a deposition angle α with respect to the tube axis is specified for an elongate element, it is understood that part of the elongate elements is arranged with an angle α and that the other part is arranged at an angle-α with respect to the tube axis.

Reinforcing layer 2 can be obtained by alternating reinforcing elements substantially perpendicular to axis AA' and reinforcing elements substantially parallel to axis AA'. It is also possible to set a first reinforcing layer consisting of reinforcing elements substantially perpendicular to axis AA', then the first layer is covered with a second reinforcing layer consisting of elongate elements arranged substantially parallel to axis AA'. Conversely, it is also possible to set a first reinforcing layer consisting of reinforcing elements substantially parallel to axis AA', then to cover the first layer with a second reinforcing layer consisting of elongate elements arranged substantially perpendicular to axis AA'.

According to the invention, the elongate elements of reinforcing layer 2 cooperate with metal tube 1 so as to allow transfer of the stresses between metal tube 1 and reinforcing element layer 2. For example, the reinforcing layer can be secured to the ends of tube 1, in the neighborhood of parts C, using linking means 3. Means 3 form an interface between reinforcing layer 2 and metal tube 1. When the hoop-wound tube is subjected to an axial tensile stress, means 3 allow the axial tensile stress to be transmitted jointly to metal tube 1 and to reinforcing layer 2. Thus, the tensile stress is distributed or shared among metal tube 1 and reinforcing layer 2. The grooves are circumferential and perpendicular to axis AA' of the tube.

For example, linking means 3 can be a trap lock type device as described in document U.S. Pat. No. 6,042,152 A. The elements of the reinforcing layer are engaged and maintained in grooves provided at the level of parts C of the metal tube.

Linking means 3 can also consist of a pin device described in document U.S. Pat. No. 5,288,109. Metal inserts or pins run through the thickness of the reinforcing layer at the level of parts C of the metal tube. The pins are partly housed in blind holes provided in part C of the metal tube.

Figure 2:
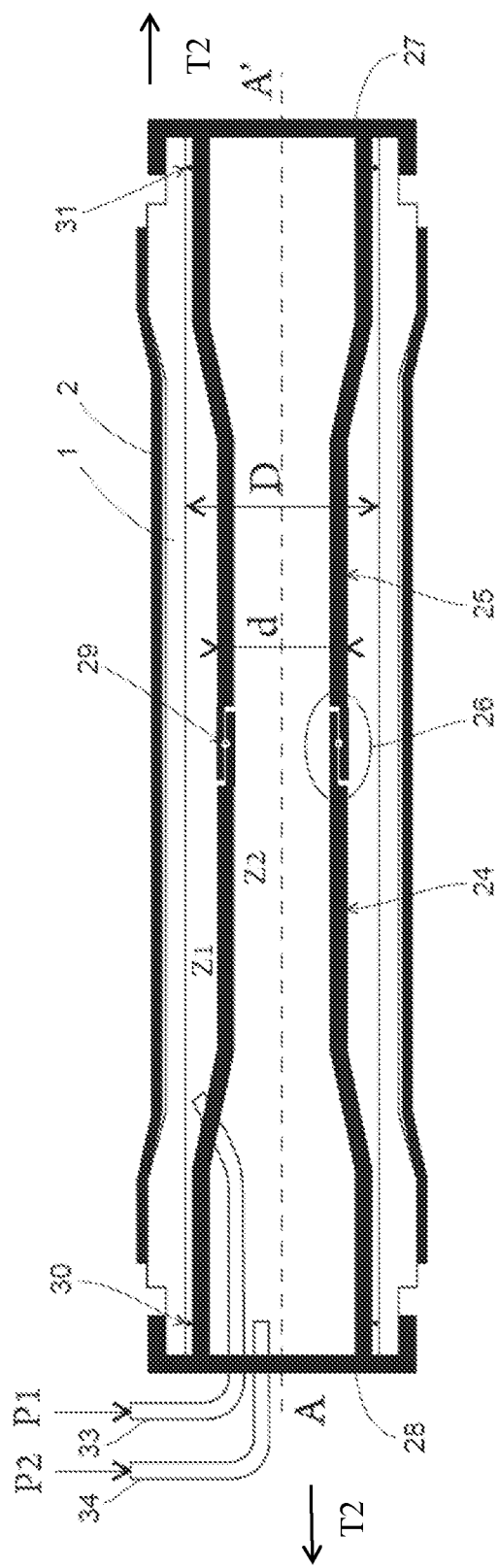
FIG. 2 diagrammatically shows a hoop winding device according to the invention.

Tube 1 provided with reinforcing layer 2 is inserted in a hoop winding device as diagrammatically shown in FIG. 2. The device consists of two tube portions 24 and 25 of smaller outside diameter d than inside diameter D of tube 1. Tube portions 24 and 25 are joined by link 26 that enables tube 24 to slide with respect to tube 25. For example, link 26 can be a telescopic fit of tube 24 in tube 25. Tube portions 24 and 25 are arranged within tube 1 substantially parallel to its axis AA'. The end of tube 25 is closed by plug 27. For example, plug 27 is welded to the end of tube 25 opposite link 26. Similarly, the end of tube 24 is closed by plug 28. Furthermore, plugs 27 and 28 are respectively secured to the ends of metal tube 1, for example by tightening or screwing on connection terminals E shown in FIG. 1.

In FIG. 2, seals 29, 30 and 31 allow to create two distinct closed zones. Seal 29 allows link 26 between tube portions 24 and 25 to be sealed. Seal 30 is arranged between the outer surface of tube portion 24 and the inner surface of tube 1, preferably at the level of reinforced part C or of terminal E.

Seal 31 is arranged between the outer surface of tube portion 25 and inner surface of tube 1, preferably at the level of reinforced part C or of terminal E. Thus, the closed space delimited by the inner surface of tube 1 and the outer surfaces of tube portions 24 and 25, sealed by seals 29, and 31, forms a first enclosure Z1. The closed space delimited by the inner surface of tube portions 24 and 25, closed by plugs 27 and 28, forms a second enclosure Z2. Tube 33 allows to feed a fluid at a pressure P1 into enclosure Z1. Tube 34 allows to feed a fluid at a pressure P2 into enclosure Z2.

In order to subject metal tube 1 and reinforcing elements 2 to a stress, a pressure P1 and a pressure P2, sufficiently high to plastically deform metal tube 1, are applied. Pressures P1 and P2 can be applied simultaneously. It is also possible to apply one of the pressures, P1 or P2, first, then the other, for example P1 then P2, or P2 then P1.

Pressure P1 in enclosure Z1 allows to radially deform tube 1. Indeed, the fluid in enclosure Z1 applies a pressure onto the inner surface of tube 1. The internal pressure applied on the inner surface of tube 1 causes radial expansion of tube 1. When the elastic deformation limit is exceeded, the tube is plastically deformed and no longer returns to its initial shape when pressure P1 is reduced. The residual deformation of tube 1 induces tensional stresses in the circumferential reinforcing layers 2, which themselves induce radial compressive stresses, i.e. compressive stresses oriented in the direction of the radii in metal tube 1.

Pressure P2 in enclosure Z2 allows to axially deform tube 1. In fact, the fluid in enclosure Z2 imposes a pressure on plugs 27 and 28 that transmit tensile forces, parallel to axis AA', to the ends of metal tube 1. The tensile forces T2 exerted on the ends of tube 1 via enclosure Z2 subjected to a pressure P2 are $$T2 = P2\frac{\pi D^2}{4}.$$

The tensile forces imposed on tube 1 cause an elongation of tube 1. When the elastic deformation limit is exceeded, the tube is plastically deformed and no longer returns to its initial shape when pressure P2 is reduced. The residual deformation of tube 1 induces tensional stresses in axial reinforcing layers 2, which themselves induce axial compressive stresses, i.e. compressive stresses oriented in the direction of axis AA', in metal tube 1.

The fact that the two enclosures Z1 and Z2 are distinct and independent allows pressures P1 and P2 to be applied independently of one another. Thus, the method according to the invention allows independent radial and axial prestresses to be applied so as to optimize the strength of the hoop-wound tube.

By applying a pressure P1 in enclosure Z1, an axial tensile force is also applied at the ends of tube 1 due to the bottom effect. This axial tension depends on the annular section of enclosure Z1 measured perpendicular to axis AA' at the level of seal 29. According to the invention, the value of the annular section is minimized so as to reduce the bottom effect to a lower level, preferably to a value at least 50% below the value of force T2 generated by pressure P2 in enclosure Z2. The annular section can be reduced by increasing the value of diameter d at the level of the seal. The bottom effect induced by the pressure undergone by enclosure Z1 does not prevent from operating according to the invention by setting pressures P1 and P2 independently so as to apply a tensile force T2 independently of pressure P1.

In general terms, the present invention aims to apply an axial hoop winding traction T2 whose value can vary and be set by the user independently of value P1 of the radial hoop winding pressure. For example, radial hoop winding pressure P1 is applied by a first means comprising a first enclosure brought under pressure and hoop winding traction T2 is applied by a second means comprising a second enclosure brought under pressure. Thus, a radial hoop winding value P2 can be set, then T2 can be determined without taking account of the value of P2. This is possible because, according to the invention, pressure P1 can be varied independently of pressure P2.

The invention can also be implemented using two distinct devices for applying a tensile force T onto the ends of the metal tube and a pressure P onto the inner surface of the metal tube.

Figure 3:
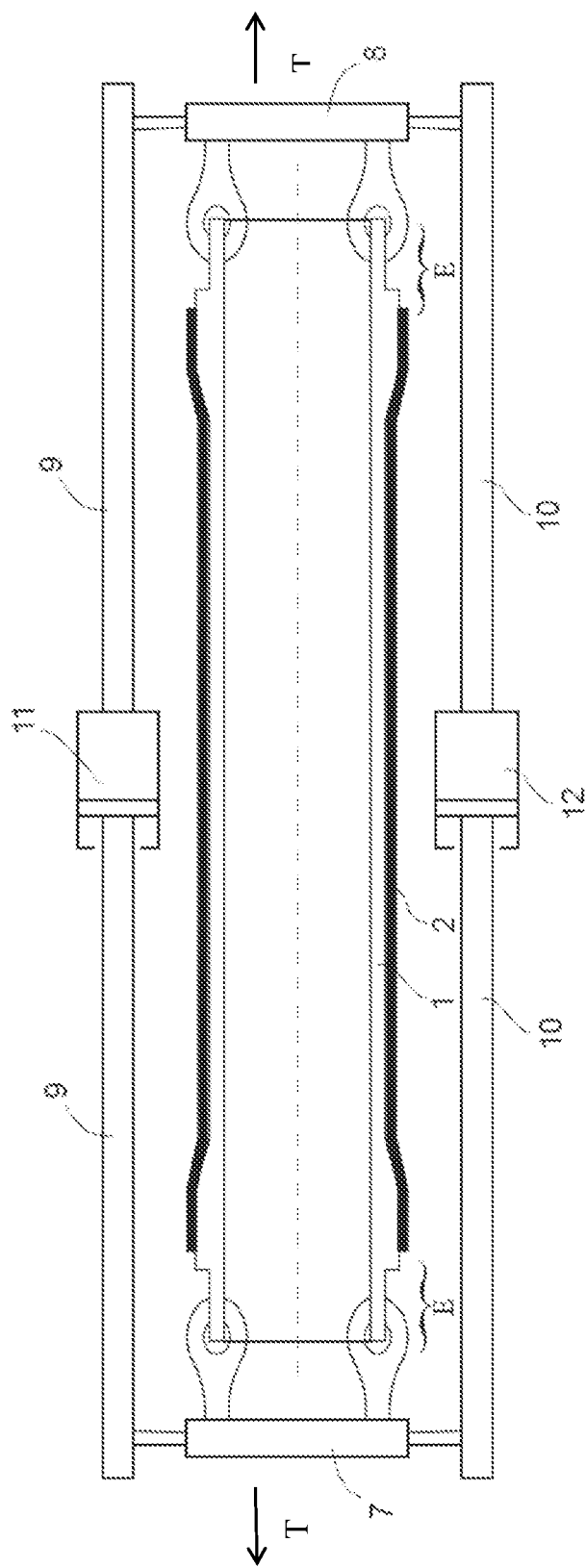
FIGS. 3 and 4 diagrammatically show axial hoop winding devices according to the invention, FIGS. 5 and 6 diagrammatically show circumferential hoop winding devices according to the invention.
Figure 4:
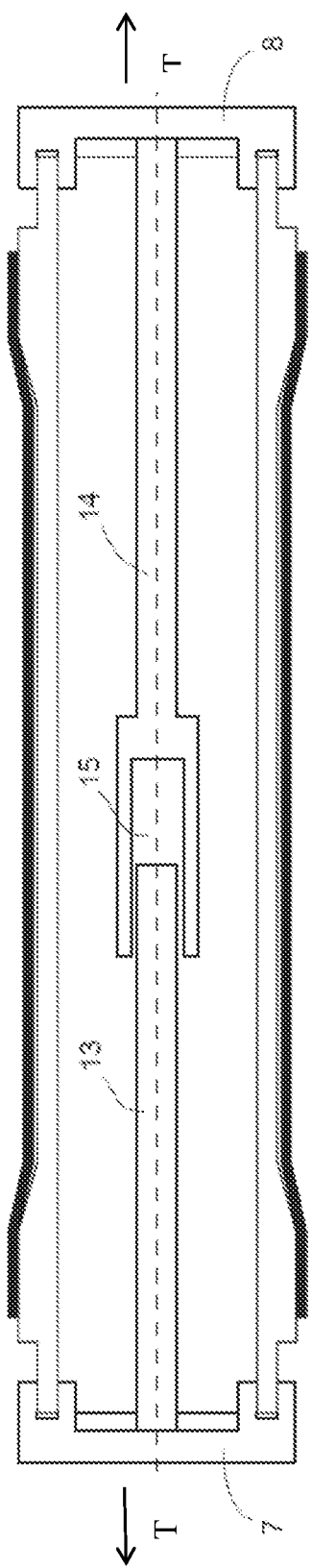

In connection with FIGS. 3 and 4, tube 1 covered with a reinforcing layer 2 is arranged on a drawing bench. The ends are held by prehension means 7 and 8, for example pliers, a screw-nut system (the ends of tube 1 forming the screw, means 7 and 8 being the nuts). Prehension means 7 and 8 are assembled by one or more jacks arranged inside or outside metal tube 1. In connection with FIG. 3, jacks 11 and 12 connected to prehension means 7 and 8 by rods 9 and 10 are arranged outside tube 1. Jacks 11 and 12 allow a tensile stress T to be applied to the ends of metal tube 1. In connection with FIG. 4, the assembly made up of jack 15 and rods 13 and 14 is arranged inside tube 1. Jack 15 allows prehension means 7 and 8 to be moved away and a tensile stress T to be applied to the ends of tube 1. The devices described in connection with FIGS. 3 and 4 allow to apply an axial tensile stress to the tube and therefore to carry out an axial hoop winding operation without inducing radial stresses, thus without inducing radial hoop winding.

Figure 5:
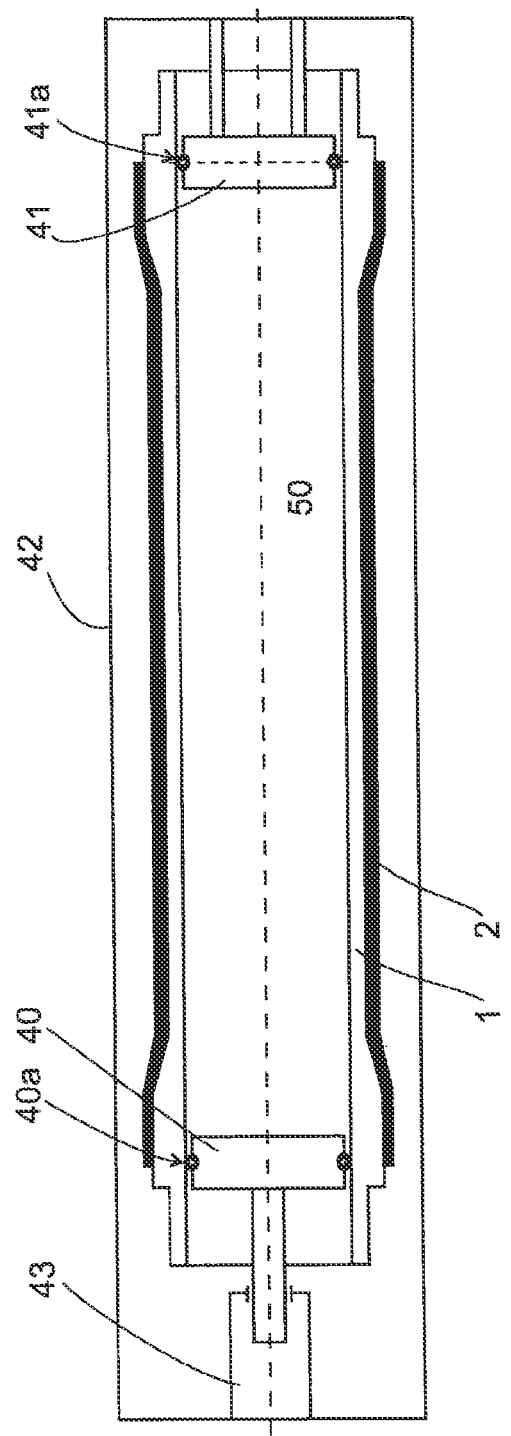
Figure 6:
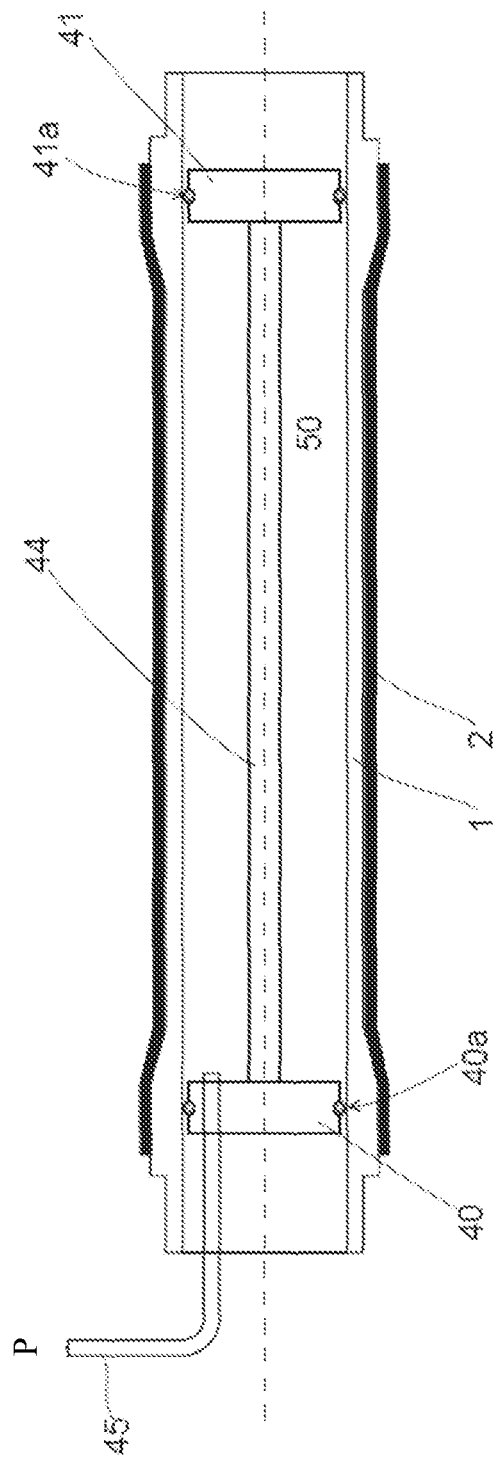

FIGS. 5 and 6 show two devices allowing a pressure to be applied onto the inner wall of metal tube 1 covered with reinforcing layer 2. The ends of metal tube 1 are closed by plugs 40 and 41. Seal 40a, respectively seal 41a, provides sealing between plug 40, respectively plug 41, and the inner wall of metal tube 1. Thus, the space delimited by plugs 40, 41 and by the inner wall of tube 1 forms a closed and sealed enclosure 50. In connection with FIG. 5, plug 41 is held in position by frame 42. Jack 43 allows plug 40 to be moved along the tube axis. A substantially incompressible fluid is fed into enclosure 50, then jack 43 is actuated in order to impose a pressure P in enclosure 50 and therefore on the inner wall of metal tube 1. In connection with FIG. 6, plug 41 is secured to plug 40 by one or more rods 44. Branch connection 45 allows a fluid under pressure to be fed into enclosure 50 so as to apply a pressure P onto the inner wall of metal tube 1. The devices described in connection with FIGS. 5 and 6 allow to apply an internal pressure to the tube and therefore to carry out a radial hoop winding operation without inducing axial tensile stresses, and thus without inducing radial hoop winding.

One of the devices described in connection with FIGS. 3 and 4 can be used for introducing compressive prestresses in the direction of axis AA' in metal tube 1. One of the devices described in connection with FIGS. 5 and 6 can also be used for inducing radial compressive stresses in metal tube 1.

The numerical examples given hereafter illustrate the interest of the hoop winding technique according to the invention.

Figure 7:
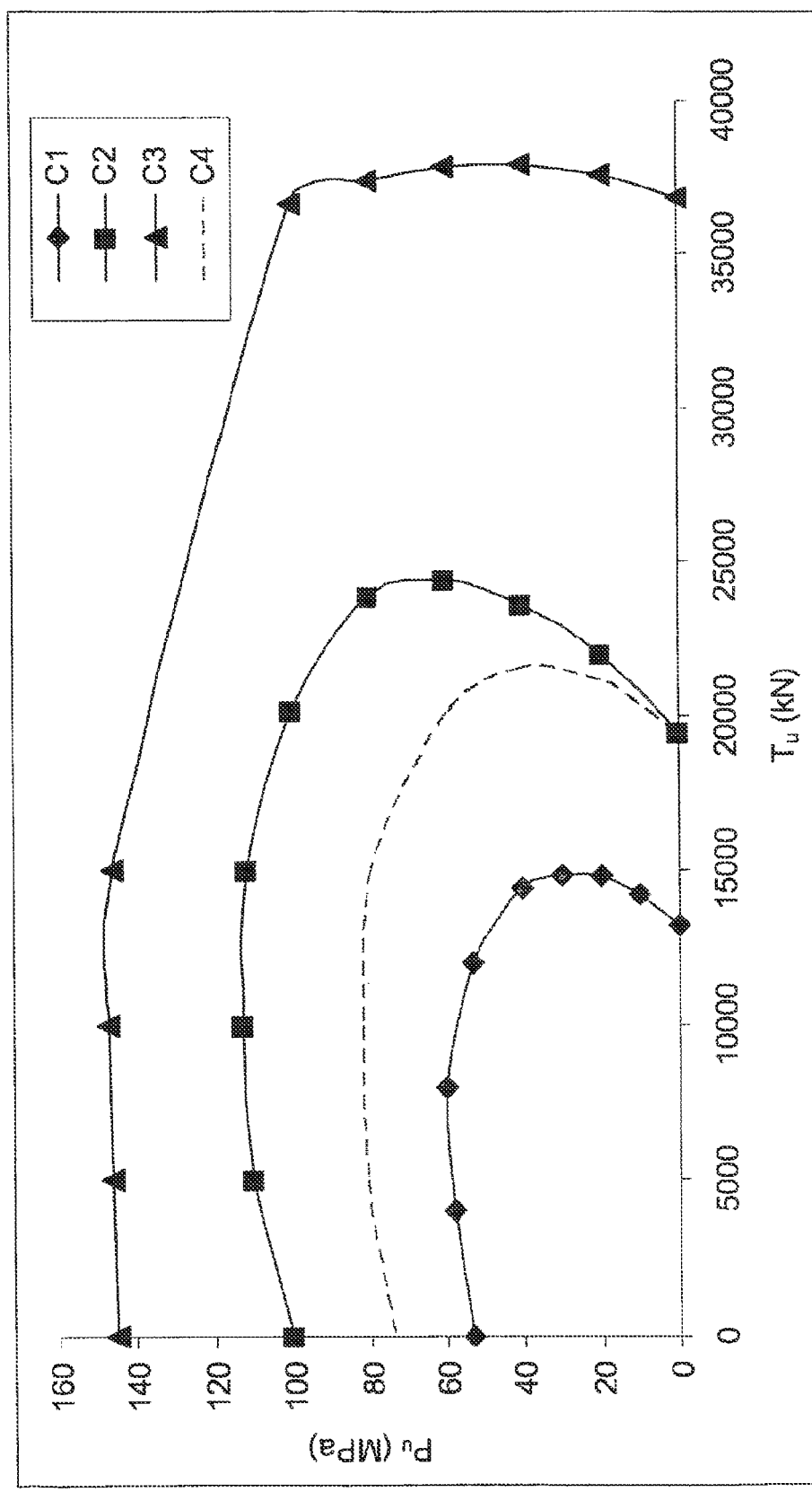
FIG. 7 shows a diagram giving the axial and pressure resistance of tubes.

FIG. 7 shows the mechanical strength of a tube, the horizontal axis Tu indicates the tension in kN and the vertical axis Pu the internal pressure in MPa.

We consider a tube of internal diameter 14" (0.3556 m) and of thickness 14.5 mm made of steel with an elastic limit of 740 MPa.

Curve C1 with black diamonds shows the strength envelope of the non-hoop wound tube.

The same steel tube is covered with a 10-mm thick circumferential hoop layer and with a 10-mm thick axial hoop layer. The tube is hoop wound according to the method of the invention by applying a pressure P1 of 1070 bars and a traction T2 of 18 mega Newton.

Curve C2 with squares shows the elastic strength envelope of the hoop-wound tube. Curve C3 with triangles shows the breaking strength envelope of the hoop-wound tube.

By comparison, curve C4 in discontinuous line shows the elastic strength of a non-hoop wound tube of internal diameter 14" (0.3556 m) and of thickness 21 mm made of steel with an elastic limit of 740 MPa.

By comparing curves C2 and C4, it is observed that the 14.5-mm thick hoop-wound tube has an elastic limit in simple tension equivalent to that of the non-hoop wound 21-mm thick tube and an elastic limit under simple internal pressure higher than that of the non-hoop wound 21-mm thick tube.

The invention claimed is:

1. A hoop winding method for manufacturing a reinforced tube, wherein the following operations are carried out:
   a) providing a metal tube, then
   b) depositing a reinforcing layer around the metal tube, the reinforcing layer comprising elongate internal pressure and axial traction reinforcement elements, by alternating deposition of the reinforcement elements forming an angle between 60 and 90° to the axis of the tube with deposition of the reinforcement elements forming an angle between 0 and 30° to the axis of the tube, then
   c) imposing a tensile force at the ends of the metal tube so as to plastically deform the metal tube, the tensile force being oriented parallel to the metal tube axis, wherein a residual deformation of the metal tube caused by the tensile force induces tensional stresses in the reinforcement elements forming an angle between 0 and 30° to the axis of the metal tube, and the reinforcement elements forming an angle between 0 and 30° to the axis of the metal tube induce an axial compressive stress in the metal tube after release of the force, and
   d) imposing a pressure onto the inner wall of metal tube so as to plastically deform the metal tube, wherein a residual deformation of the metal tube caused by the pressure induces tensional stresses on the reinforcement elements forming an angle between 60 and 90° to the axis of the tube, and the reinforcement elements forming an angle between 60 and 90° to the axis of the tube induce a radial compressive stress in the metal tube after release of the pressure,
   the method being characterized in that the value of said pressure is set independently of the value of said tensile force.

2. A method as claimed in claim 1 wherein, in operation c), the tensile force is imposed using a jack.

3. A method as claimed in claim 1 wherein, in operation d), an enclosure is formed in the metal tube, a part of the enclosure being made up of said inner wall of the metal tube, and a fluid under pressure is injected into the enclosure.

4. A method as claimed in claim 3, wherein the enclosure has an annular shape contained between the inner wall of the metal tube and a tubular second wall arranged in the metal tube.

5. A method as claimed in claim 1, wherein operations c) and d) are carried out simultaneously.

6. A method as claimed in claim 1, wherein operations c) and d) are carried out sequentially.

7. A method as claimed in claim 1, wherein the reinforcing layer is secured to the two ends of the metal tube by a linking means.

8. A method as claimed in claim 1, wherein the metal tube is made from steel, an aluminium alloy or a titanium alloy.

9. A method as claimed in claim 1, wherein the elongate elements consist of reinforcing fibers coated with a polymer matrix.

10. A method as claimed in claim 9, wherein the reinforcing fibers are selected from among glass fibers, carbon fibers and aramid fibers, and the polymer matrix is selected from among a polyethylene, a polyamide, a polyether ether ketone, a polypropylene, a polyvinylidene fluoride and an epoxide.

* * * * *